(12) United States Patent
DeVeny et al.

(10) Patent No.: US 7,622,836 B2
(45) Date of Patent: Nov. 24, 2009

(54) WHEEL ASSEMBLY WITH INTEGRAL ELECTRIC MOTOR

(75) Inventors: Jay DeVeny, Birmingham, MI (US); Herb Larsen, Clarkston, MI (US); Barry Groves, Pontiac, MI (US); Clinton F. Justice, Canton, MI (US)

(73) Assignee: Axletech International IP Holdings, LLC, Troy, MI (US)

( * ) Notice: Subject to any disclaimer, the term of this patent is extended or adjusted under 35 U.S.C. 154(b) by 0 days.

(21) Appl. No.: 12/168,298

(22) Filed: Jul. 7, 2008

(65) Prior Publication Data

US 2008/0264705 A1 Oct. 30, 2008

Related U.S. Application Data

(62) Division of application No. 11/243,347, filed on Oct. 4, 2005, now Pat. No. 7,420,301.

(60) Provisional application No. 60/615,766, filed on Oct. 4, 2004.

(51) Int. Cl.
*H02K 7/10* (2006.01)
(52) U.S. Cl. .................. 310/75 C; 310/83; 180/65.5
(58) Field of Classification Search ........... 310/75 C, 310/67 A, 83, 67 R; 180/65.5, 65.6
See application file for complete search history.

(56) References Cited

U.S. PATENT DOCUMENTS

| | | | |
|---|---|---|---|
| 3,370,668 A | 2/1968 | Goodacre | |
| 3,812,928 A | 5/1974 | Rockwell et al. | |
| 3,897,843 A | 8/1975 | Hapeman et al. | |
| 5,014,800 A | 5/1991 | Kawamoto et al. | |
| 5,087,229 A | 2/1992 | Hewko et al. | |
| 5,127,485 A | 7/1992 | Wakuta et al. | |
| 5,180,180 A | 1/1993 | Yamashita et al. | |
| 5,246,082 A | 9/1993 | Alber | |
| 5,272,938 A | 12/1993 | Hsu et al. | |
| 5,382,854 A | 1/1995 | Kawamoto et al. | |
| 5,600,191 A | 2/1997 | Yang | |
| 5,796,192 A | 8/1998 | Riepl | |
| 5,818,134 A | 10/1998 | Yang et al. | |
| 6,100,615 A | 8/2000 | Birkestrand | |
| 6,177,744 B1 * | 1/2001 | Subler et al. ............. 310/90 |
| 6,321,863 B1 | 11/2001 | Vanjani | |
| 6,328,123 B1 | 12/2001 | Niemann et al. | |
| 6,355,996 B1 | 3/2002 | Birkestrand | |
| 6,540,632 B1 | 4/2003 | Wendl et al. | |

(Continued)

*Primary Examiner*—Dang D Le
(74) *Attorney, Agent, or Firm*—Howard & Howard Attorneys PLLC

(57) ABSTRACT

The subject invention provides a wheel assembly (20) having a spindle (26) for attachment to a vehicle along a rotational axis (R). An electric motor (22) is disposed radially about the spindle (26) and includes a stationary stator (34) and a rotor (36) rotatable about the rotational axis (R) relative to the stator (34). A rotor support (40) is disposed about the spindle (26) and includes a collar (42) rotatably supported by at least one rotor support bearing (46) on the spindle (26). The rotor support (40) includes a flange (44) disposed within a predetermined axial distance (D) and extending radially outward from the collar (42) to support the rotor (36). A planetary gear system (62) interconnects the rotor support (40) and a wheel drive (52) for reducing rotational speed of the rotor (36) and increasing the torque of the wheel assembly (20).

10 Claims, 4 Drawing Sheets

U.S. PATENT DOCUMENTS

| | | |
|---|---|---|
| 6,590,306 B2 | 7/2003 | Terada |
| 6,722,459 B1 | 4/2004 | Wendl et al. |
| 6,752,227 B1 | 6/2004 | Bachmann |
| 6,922,004 B2 | 7/2005 | Hashimoto et al. |
| 2002/0134597 A1 | 9/2002 | Mann et al. |
| 2003/0015360 A1 | 1/2003 | Villeneuve |
| 2004/0099455 A1 | 5/2004 | Nagaya |
| 2005/0045392 A1 | 3/2005 | Maslov et al. |
| 2005/0045393 A1 | 3/2005 | Mizutani et al. |
| 2005/0061565 A1 | 3/2005 | Mizutani et al. |

* cited by examiner

WHEEL ASSEMBLY WITH INTEGRAL ELECTRIC MOTOR

CROSS REFERENCE TO RELATED APPLICATION

The subject patent application is a divisional patent application of co-pending U.S. patent application Ser. No. 11/243,347, filed on Oct. 4, 2005, which claims priority to and the benefits of U.S. provisional patent application Ser. No. 60/615,766, filed on Oct. 4, 2004.

BACKGROUND OF THE INVENTION

1. Field of the Invention

The subject invention provides an electric drive wheel assembly for a vehicle.

2. Description of the Prior Art

The electric drive wheel assemblies of the type described herein are typically utilized in military vehicles, as well as heavy construction equipment, such as lift trucks and cranes. Often, these vehicles must operate in off-road conditions, which require each wheel to be driven independently. Accordingly, each of the electric drive wheel assemblies of the vehicle incorporates an electric motor into the wheel assembly for providing a rotational movement thereto. The electric motor operates at a pre-determined rotational speed and torque. Therefore, a planetary gear system, often referred to as a reduction gear system, is coupled to the electric motor. The planetary gear system transmits the rotational movement from the electric motor to a wheel rim, while reducing rotational speed of the wheel rim relative to the electric motor and increasing the torque provided by the electric motor.

U.S. Pat. No. 3,812,928 issued to Rockwell et al., discloses an electric wheel assembly for a vehicle. The wheel assembly includes a non-rotating spindle attached to the vehicle along a rotational axis. An electric motor is concentric with the spindle and includes a stator surrounding and secured to the spindle. A rotor is concentric with the stator and is disposed about an outer periphery of the stator. The rotor is rotatable about the rotational axis relative to the stator. The stator and the rotor extend a predetermined axial distance along the rotational axis of the spindle. A wheel drive is rotatably supported by the spindle for rotation about the rotational axis. A first rotor support and a second rotor support are rotatably supported on the spindle. The first and second rotor supports are each supported by a rotor support bearing for rotation about the rotational axis of the spindle. The first rotor support is near the first end of the spindle and includes a flange extending radially outward along a first side of the electric motor to the rotor. The second rotor support is disposed opposite the electric motor, and also includes a flange extending radially outward along a second side of the electric motor to the rotor. A planetary gear system mechanically interconnects the second rotor support and the wheel drive for transmitting rotational movement of the rotor to the wheel drive.

Another example of an electric wheel assembly is provided in U.S. Pat. No. 6,328,123 issued to Niemann et al. This wheel assembly includes a spindle attached to an axle along a rotational axis. An electric motor is concentric with the spindle and includes a stator surrounding and secured to the spindle. The stator and the rotor are radially spaced from the spindle. A rotor is concentric with the stator and is disposed about an inner periphery of the stator and rotatable about the rotational axis relative to the stator. A wheel drive is rotatably supported by the spindle for rotation about the rotational axis. A rotor support is rotatably supported on the spindle near the second end thereof. The rotor support rotatably supports the rotor for rotation about the rotational axis. The rotor support includes a flange extending outwardly to the rotor along an outer edge of the electric motor near the second end of the spindle. The stator and the rotor extend inward toward the axle a predetermined axial distance along the rotational axis of the spindle. A planetary gear system mechanically interconnects the rotor support and the wheel drive for transmitting rotational movement of the rotor to the wheel drive.

The above prior art designs suffer from being overly large, cumbersome, and/or difficult to service. Accordingly, there remains a need to develop an electric wheel assembly that is relatively compact and can be easily serviced or modified.

SUMMARY OF THE INVENTION AND ADVANTAGES

The subject invention provides an electric drive wheel assembly for a vehicle. The assembly includes a non-rotating spindle having a first end for attachment to the vehicle and a second end spaced from the first end along a rotational axis. An electric motor is concentric with the spindle and includes a stator surrounding and secured to the spindle. A rotor is concentric with the stator and is rotatable about the rotational axis relative to the stator. The stator and the rotor extend a predetermined axial distance along the rotational axis. A wheel drive is rotatably supported by the spindle for rotation about the rotational axis. A rotor support is rotatably supported on the spindle for rotatably supporting the rotor for rotation about the rotational axis. A planetary gear system is mechanically interconnected to the rotor support and the wheel drive for transmitting rotational movement of the rotor to the wheel drive. The assembly is characterized by the rotor support having a radially extending flange disposed along the predetermined axial distance.

Accordingly, the subject invention provides a relatively compact electric wheel assembly suitable for use in heavy vehicles while minimizing the overall length of the spindle and thereby the wheel assembly. The radially extending flange disposed within the predetermined axial distance allows for the wheel drive and the planetary gear system to be at least partially disposed within the predetermined axial distance between the flange of the rotor support and the second end of the spindle. Additionally, the radially extending flange of the rotor support may be disposed between the first end (attachment end) of the spindle and the planetary gear system, allowing easy access to the planetary gear system without any interference from the flange of the rotor support. Hence, the entire planetary gear system and wheel drive can be easily serviced or exchanged.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, an electric drive wheel assembly is shown generally at 20. The wheel assembly 20 is designed to be used on a vehicle (not shown). The wheel assembly 20 includes an integral electric motor, generally shown at 22, for providing exclusive and/or supplemental power to the vehicle during certain driving conditions. It should be understood that the vehicle provides an eclectic current to the wheel assembly 20 for motivating the electric motor 22 and that a wheel rim 24 having a tire (not shown) mounted thereon is attached to the wheel assembly 20.

Figure 1:
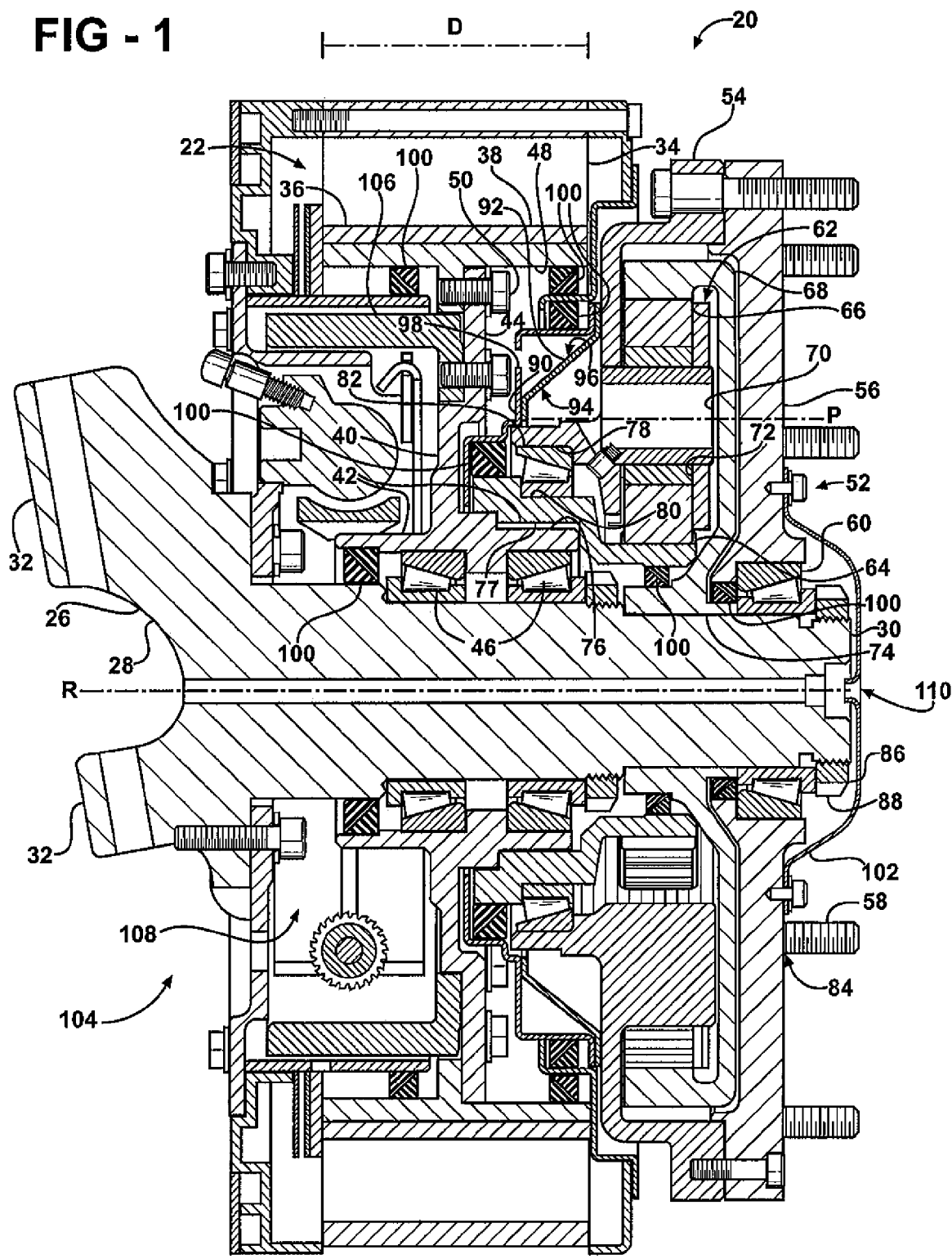
FIG. 1 is a cross-sectional view of an electric drive wheel assembly.
Figure 2:
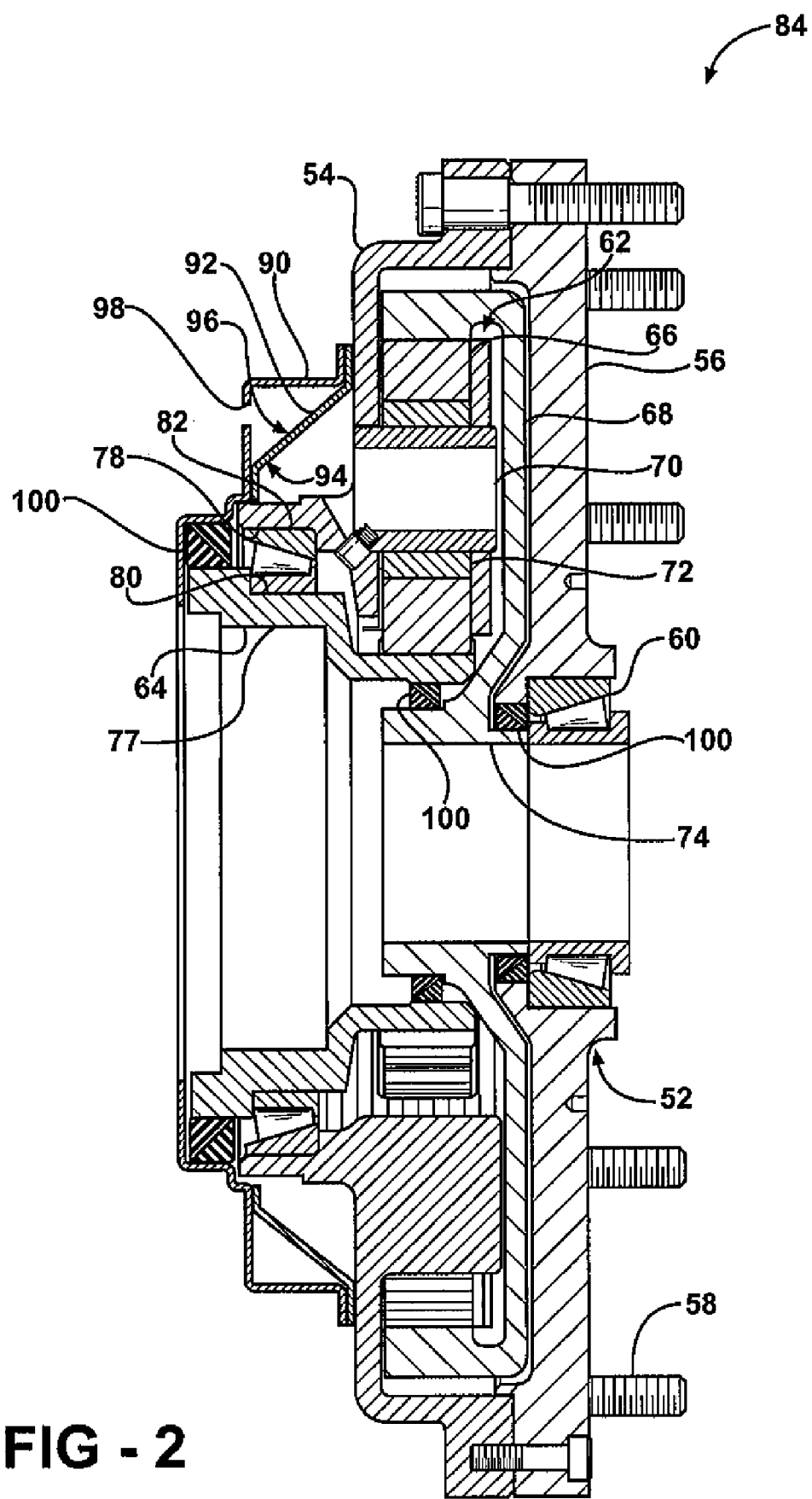
FIG. 2 is a cross-sectional view of a gearbox unit of the wheel assembly.
Figure 3:
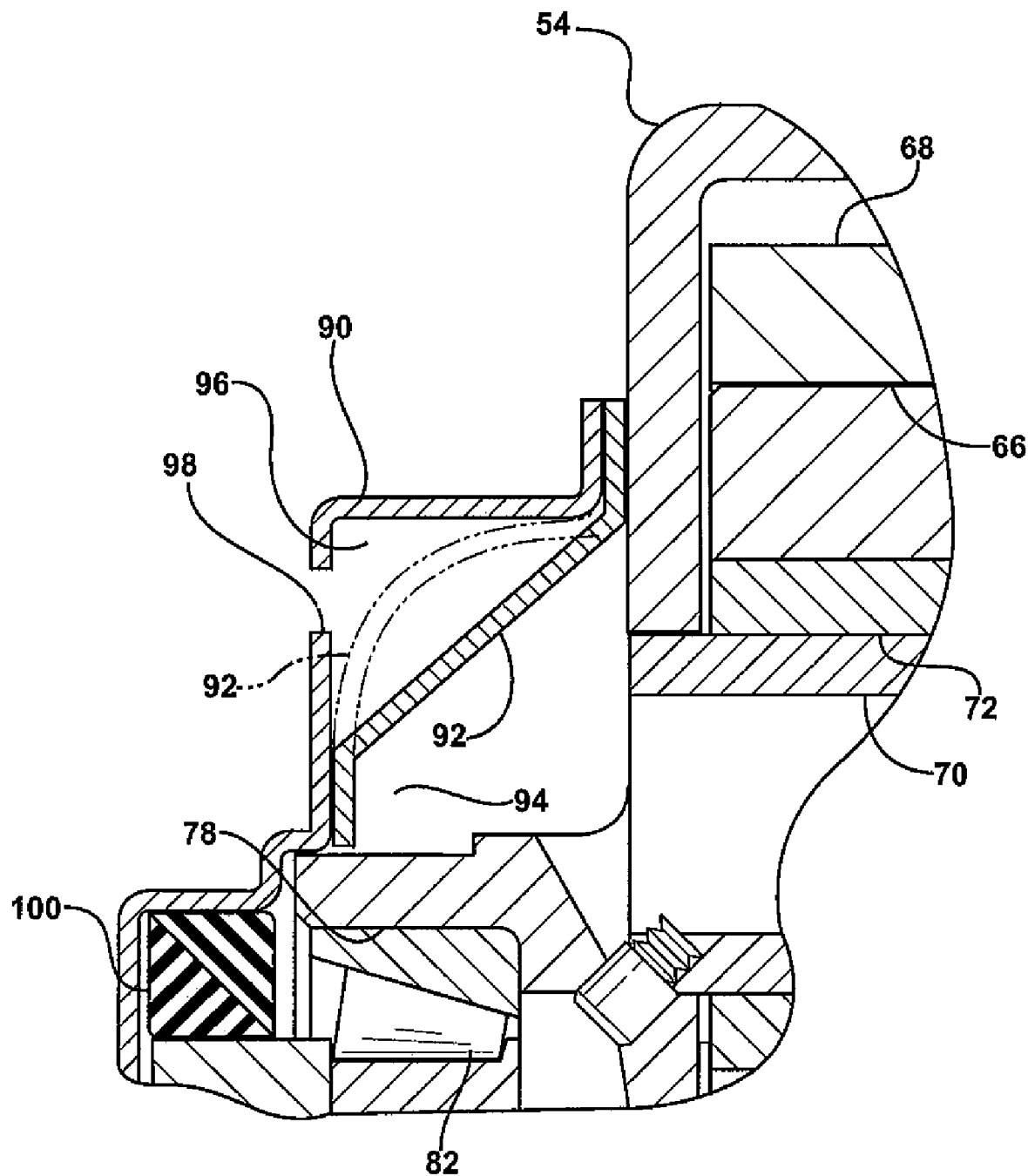
FIG. 3 is an enlarged fragmentary cross-sectional view of the gearbox unit showing a flexible member.

A preferred embodiment of the wheel assembly 20 is shown in FIGS. 1 through 3. The wheel assembly 20 includes a non-rotating spindle 26 having a first end 28 for attachment to the vehicle and a second end 30 spaced from the first end 28 along a rotational axis R. As shown in FIG. 1, the first end 28 of the spindle 26 includes a pair of mounting arms 32 for supporting the spindle 26 and the entire wheel assembly 20 on the vehicle. The pair of mounting arms 32 defines a knuckle for allowing the wheel assembly 20 to pivot relative to the vehicle for steering the vehicle. It should be appreciated that the mounting arms 32 on the first end 28 of the spindle 26 could be configured differently for a non-steering wheel assembly 20.

The electric motor 22 is concentric with the spindle 26 and includes a stator 34 surrounding and secured to the spindle 26. A rotor 36 is concentric with the stator 34 and is rotatable about the rotational axis R relative to the stator 34. The stator 34 and the rotor 36 are radially spaced from the spindle 26 and extend a predetermined axial distance D along the rotational axis R. In this embodiment, the stator 34 includes an inner surface 38, with the rotor 36 being disposed between the stator 34 and the spindle 26. The rotor 36 rotates about the spindle 26 adjacent the inner surface 38 of the stator 34.

A rotor support 40 is rotatably supported on the spindle 26 and extends to the electric motor 22. The rotor support 40 rotatably supports the rotor 36 for rotation about the rotational axis R. The rotor support 40 includes a collar 42 disposed radially about the spindle 26 within the predetermined axial distance D. The rotor support 40 further includes a flange 44 extending radially outward from the collar 42. The flange 44 is disposed within the predetermined axial distance D defined by the stator 34 and the rotor 36. The assembly 20 includes at least one rotor support bearing 46 disposed between the collar 42 of the rotor support 40 and the spindle 26 for rotatably supporting the rotor support 40 on the spindle 26. The rotor 36 includes a bracket 48 for attaching the rotor 36 to the flange 44. As shown in FIG. 1, the flange 44 extends radially outward from the approximate center of the collar 42 towards the rotor 36, and the bracket 48 extends radially inward from the approximate center of the rotor 36 towards the spindle 26. The bracket 48 is connected to the flange 44 by a bolt 50.

A wheel drive, generally shown at 52, is rotatably supported by the spindle 26 for rotation about the rotational axis R. The wheel drive 52 includes a planetary carrier 54 rotatable about the spindle 26 for rotation about the rotational axis R. The wheel drive 52 further includes and a front cover 56 attached to the planetary carrier 54 for rotation therewith about the rotational axis R. The front cover 56 includes a plurality of wheel studs 58 for attaching the wheel rim (not shown) to the wheel assembly 20. The wheel assembly 20 includes a front cover bearing 60 disposed between the front cover 56 and the spindle 26 for rotatably supporting the front cover 56 on the spindle 26. The front cover 56 includes a heat absorbing material, such as aluminum, for absorbing heat. It should be understood that any suitable material capable of absorbing heat may be utilized for the front cover 56. The front cover 56 dissipates the heat absorbed from the wheel assembly 20 to the air adjacent the wheel assembly 20 for cooling the wheel assembly 20.

A planetary gear system, generally shown at 62, is disposed adjacent the planetary carrier 54 and wheel drive 52. In this embodiment, the planetary gear system 62 mechanically interconnects the rotor support 40 and the wheel drive 52 for transmitting rotational movement of the rotor 36 to the wheel drive 52. The planetary gear system 62 and the wheel drive 52 are at least partially disposed within the predetermined axial distance D defined by the stator 34 and the rotor 36. In particular, the planetary gear system 62 and the wheel drive 52 are disposed about the spindle 26 between the rotor support 40 and the second end 30 of the spindle 26. The planetary gear system 62 includes a sun gear 64, a plurality of planetary gears 66, and a ring gear 68 intermeshing together, with the sun gear 64 engaging the planetary gears 66 and the planetary gears 66 engaging the ring gear 68. The planetary gear system 62 reduces rotational speed between the rotor 36 and the wheel drive 52. Each of the plurality of planetary gears 66 includes a pin 70 having a planetary axis P for attaching the planetary gear 66 to the planetary carrier 54. A planetary bearing 72 is disposed radially between the planetary gear 66 and the pin 70 for rotatably supporting the planetary gear 66 on the pin 70 for rotation about the planetary axis P. The ring gear 68 is non-rotatably attached to the spindle 26 near the second end 30 of the spindle 26. The ring gear 68 includes a splined hub 74 non-rotatably connected to the spindle 26 by a splined connection therebetween.

The collar 42 of the rotor support 40 includes a splined portion 76 and the sun gear 64 includes a splined end 77. The splined portion 76 of the collar 42 and the splined end 77 of the sun gear 64 extend axially along the rotational axis R and are disposed radially about the spindle 26. The splined portion 76 of the collar 42 and the splined end 77 of the sun gear 64 mechanically interconnect the collar 42 and the sun gear 64 for transmitting rotational movement therebetween about the rotational axis R.

The planetary carrier 54 includes a bearing surface 78 extending axially inward along the spindle 26, and the sun gear 64 includes a support surface 80 radially opposite the splined end 77 of the sun gear 64. The assembly 20 includes at least one planetary carrier planetary carrier hub bearing 82 disposed between the bearing surface 78 of the planetary carrier 54 and the support surface 80 of the sun gear 64 for rotatably supporting the planetary carrier 54 on the sun gear 64. The planetary carrier planetary carrier hub bearing 82 and the rotor support bearing 46 are radially aligned along the spindle 26.

The wheel drive 52 and the planetary gear system 62 are interconnected to define a self-contained gearbox unit, generally shown at 84. A fastener 86 removably attaches the gearbox unit 84 to the spindle 26 near the second end 30 of the spindle 26. The gearbox unit 84 is at least partially disposed within the predetermined axial distance D defined by the stator 34 and the rotor 36. In particular, the gear box unit 84 is disposed about the spindle 26 between the rotor support 40 and the second end 30 of the spindle 26. As shown in FIG. 1, the fastener 86 includes a retaining nut 88 in threaded engagement with the second end 30 of the spindle 26 for retaining the gearbox unit 84 thereon.

Referring to FIG. 2, the gearbox unit 84 preferably includes the ring gear 68, the planetary carrier 54, the planetary gears 66 attached to the planetary carrier 54 by the pins 70 and the planetary bearings 72, the sun gear 64, the front cover 56, the front cover bearing 60, and the planetary carrier hub bearing 82, which are all interconnected and removable as a modular unit. Additionally, the gearbox unit 84 can include a rear cover 90 attached to the planetary carrier 54 for enclosing the planetary gear system 62 therein.

A flexible member 92 is disposed between the rear cover 90 and the planetary carrier 54 for expanding in response to an internal pressure. The flexible member 92 defines an interior chamber 94 and an outer chamber 96. The rear cover 90 includes a port 98 in fluid communication with the outer chamber 96 for allowing air to flow freely into and out of the outer chamber 96 as the flexible member 92 expands and contracts. The gearbox unit 84 further includes a plurality of seals 100 for sealing the gearbox unit 84 and a lubricant for lubricating the planetary gear system 62. The seals 100 prevent the lubricant from leaking out of the gearbox unit 84 and contaminants from entering. A grease cap 102 covers the retaining nut 88 and the front cover bearing 60 to prevent contaminants from entering.

Referring to FIG. 3, the flexible member 92 allows the air inside the gearbox unit 84 to expand as the air within the gearbox unit 84 increases in temperature, thereby eliminating the need to vent the gearbox unit 84 to the atmosphere. As the air expands at higher operating temperatures, the flexible member 92 will flex outward into the outer chamber 96. The port 98 in the rear cover 90 allows the air in the outer chamber 96 to escape, preventing any backpressure on the flexible member 92. It is contemplated that the flexible member 92 may include a bellows for expanding and contracting, however any suitable flexible material may also be used.

The planetary gear system 62 includes a gear ratio, which determines the rotational output to the wheel drive 52. The gear ratio may vary and is dependent upon the ultimate requirements of the vehicle. The gearbox unit 84, which contains the planetary gear system 62, is removable as a modular unit for allowing the gear ratio of the wheel assembly 20 to be easily changed. To change the gear ratio of the wheel assembly 20, a user removes the gearbox unit 84 and installs a different gearbox unit 84 having a different gear ratio.

Referring back to FIG. 1, the wheel assembly 20 includes a braking system, generally shown at 104, at least partially disposed within the predetermined axial distance D. The braking system 104 includes a brake drum 106 surrounding the spindle 26 and attached to the rotor support 40 for rotation about the rotational axis R. The braking system 104 includes a braking mechanism, generally shown at 108, disposed within the drum brake for actuating the braking system 104. The braking system 104 is primarily utilized for emergency braking and for securing the wheel assembly 20 when the vehicle is parked. Brake drums 106 and brake mechanisms of this type are well known and are therefore not discussed in detail.

The wheel assembly 20 can also include a tire inflation system 110 for inflating and deflating a tire. The tire inflation system 110 extends through the spindle 26 and interconnects with the wheel rim (not shown) and the tire. The tire inflation system 110 is in fluid communication with the wheel rim (not shown) and allows the inflation and deflation of the tire to be controlled from the vehicle. Tire inflation systems 10 of this type are well known and are therefore not discussed in detail.

In operation, the electric current from the vehicle motivates the rotor 36 to rotate relative to the stator 34 and the spindle 26. The rotor 36 transmits the rotational movement to the rotor support 40 and thereby to the sun gear 64 interconnected thereto by the splined connection between the collar 42 and the sun gear 64. The rotor support 40 and the sun gear 64 thereby rotate in unison. The sun gear 64 meshes with the planetary gears 66, imparting the rotational movement to the planetary gears 66. Accordingly, the sun gear 64 rotates the planetary gears 66, and thereby the planetary carrier 54, about the non-rotating ring gear 68. The planetary carrier 54 and the front cover 56 attached thereto rotate about the rotational axis R to drive the wheel rim (not shown).

Figure 4:
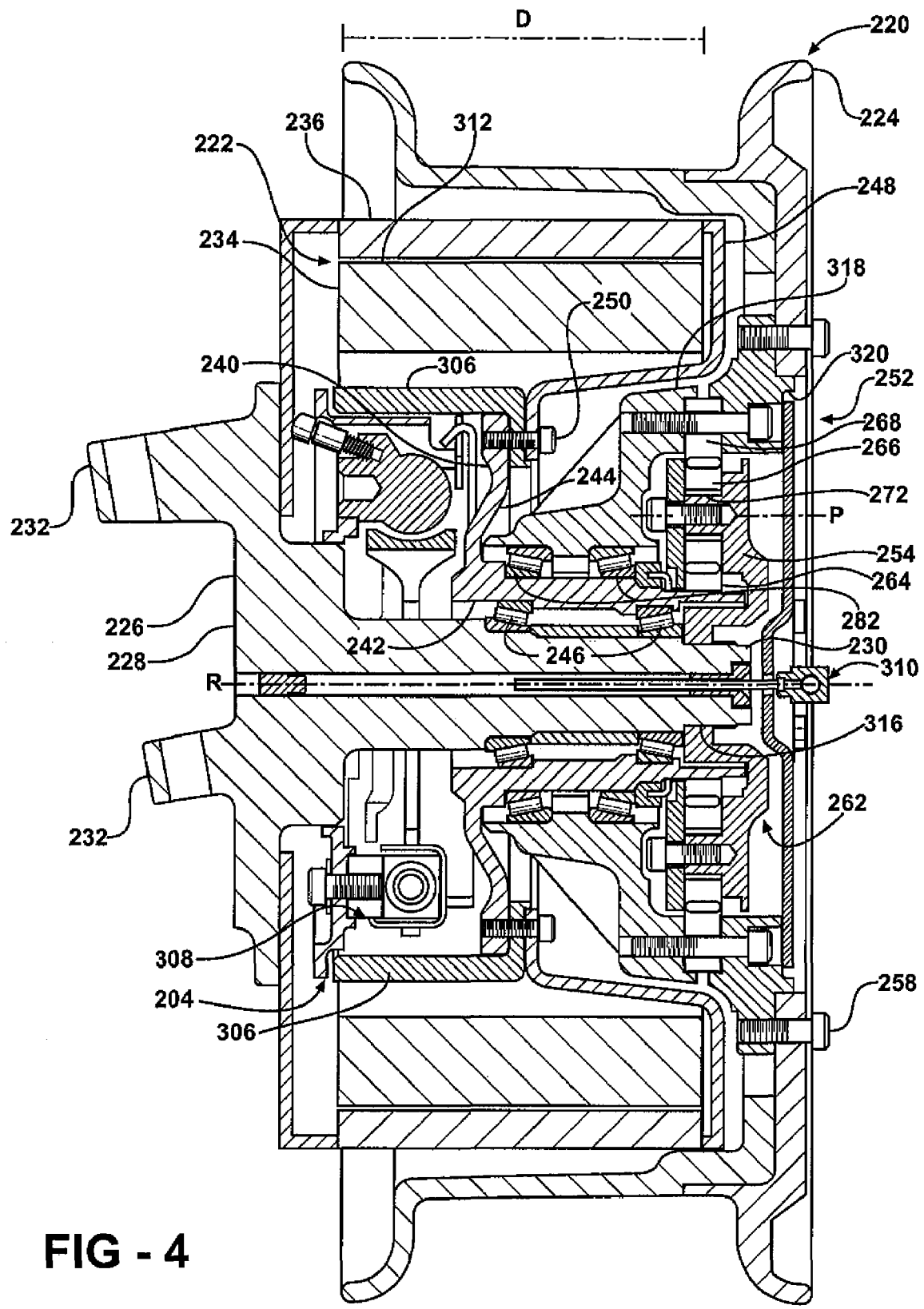
FIG. 4 is a cross-sectional view of an alternative embodiment of the wheel assembly.

An alternative embodiment of the wheel assembly is shown in FIG. 4. Throughout the alternative embodiment, common features shared with the preferred embodiment will be referenced by the same reference numeral used to describe the feature in the preferred embodiment increased by two hundred. Accordingly, the wheel assembly, which is shown generally at 20 in the preferred embodiment, is shown generally at 220 in the alternative embodiment. Likewise, the brake drum, which is referred to by the reference numeral 106 in the preferred embodiment is referred to by the reference numeral 306 in the alternative embodiment Referring to FIG. 4, the electric motor 222 is concentric with the spindle 226 and includes a stator 234 surrounding and secured to the spindle 226. A rotor 236 is concentric with the stator 234 and is rotatable about the rotational axis R relative to the stator 234. The stator 234 and the rotor 236 are radially spaced from the spindle 226 and extend a predetermined axial distance D along the rotational axis R. The stator 234 includes an outer surface 312 and is disposed between the rotor 236 and the spindle 226 with the rotor 236 rotating about the spindle 226 adjacent the outer surface 312 of the stator 234.

A rotor support 240 is rotatably supported on the spindle 226, and rotatably supports the rotor 236 for rotation about the rotational axis R. The rotor support 240 includes a collar 242 disposed radially about the spindle 226 within the predetermined axial distance D. The rotor support 240 further includes a flange 244 extending radially outward from the collar 242. The flange 244 is disposed within the predetermined axial distance D defined by the stator 234 and the rotor 236. The flange 244 extends from the collar 242 radially upward towards the approximate center of the rotor 236. The assembly 220 includes at least one rotor support bearing 246 disposed between the collar 242 of the rotor support 240 and the spindle 226 for rotatably supporting the rotor support 240 on the spindle 226. The rotor 236 includes a bracket 248 for attaching the rotor 236 to the flange 244. The bracket 248 extends radially inward from the rotor 236 toward the spindle 226 and wraps around the stator 234, extending axially inward along the rotational axis R toward the flange 244 of the rotor support 240. The bracket 248 is connected to the flange 244 by a bolt 250.

A wheel drive, generally shown at 252 is rotatably supported by the spindle 226 for rotation about the rotational axis R. The wheel drive 252 includes a planetary carrier 254 non-rotatably connected to the spindle 226 near the second end 230 of the spindle 226. The planetary carrier 254 includes a splined bore 316 non-rotatably connected to the spindle 226 by a splined connection therebetween. The wheel drive 252 includes an inner hub 318 at least partially disposed within the predetermined axial distance D defined by the stator 234 and the rotor 236. The inner hub 318 is rotatably supported by the collar 242 of the rotor support 240. The assembly 220 includes at least one planetary carrier hub bearing 282 disposed between the inner hub 318 and the collar 242 of the rotor support 240 for rotatably supporting the inner hub 318 on the collar 242 of the rotor support 240. The planetary carrier hub bearing 282 and the rotor support bearing 246 are radially aligned along the spindle 226. It should be appreciated that although the planetary carrier hub bearing 282 and rotor support bearing 246 are somewhat offset from each other, a substantial portion of these bearings 282, 246 are radially stacked relative to the spindle 226. Hence, these bearings 282, 246 are considered radially aligned along the spindle 226.

A ring gear 268 is attached to the inner hub 318 for rotation therewith about the rotational axis R. The wheel drive 252 further includes an outer hub 320 attached to the inner hub 318 for rotation about the rotational axis R with the ring gear 268 and the inner hub 318. The outer hub 320 includes a plurality of wheel studs 258 for attaching the wheel rim 224 to the wheel assembly 220.

A planetary gear system, generally shown at 262, mechanically interconnects the rotor support 240 and the wheel drive 252 for transmitting rotational movement of the rotor 236 to the wheel drive 252. The planetary gear system 262 and the wheel drive 252 are at least partially disposed within the predetermined axial distance D defined by the stator 234 and the rotor 236. The planetary gear system 262 includes a sun gear 264, a plurality of planetary gears 266, and the ring gear 268 intermeshing together, with the sun gear 64 meshing with the planetary gears 66 and the planetary gears 66 meshing with the ring gear 68. The planetary gear system 262 reduces rotational speed between the rotor 236 and the wheel drive 252. A planetary bearing 272 having a planetary axis P is disposed radially between the planetary gear 266 and the planetary carrier 254 for rotatably supporting the planetary gear 266 on the planetary carrier 254 for rotation about the planetary axis P. The sun gear 264 is attached to the collar 242 of the rotor support 240 for rotation therewith about the rotational axis R.

The assembly 220 includes a braking system, generally shown at 304, at least partially disposed within the predetermined axial distance D. The braking system 304 includes a brake drum 306 surrounding the spindle 226 and attached to the rotor support 240 for rotation about the rotational axis R. The braking system 304 includes a braking mechanism, generally shown at 308, disposed within the drum brake for actuating the braking system 304. The braking system 304 is primarily utilized for emergency braking and for securing the wheel assembly 220 when the vehicle is parked. Brake drums 306 and brake mechanisms of this type are well known and are therefore not discussed in detail.

The assembly 220 of this embodiment can also include a tire inflation system 310 for inflating and deflating a tire. The tire inflation system 310 extends through the spindle 226 and interconnects with the wheel rim 224 and the tire. The tire inflation system 310 is in fluid communication with the wheel rim 224 and allows the inflation and deflation of the tire to be controlled from the vehicle. Tire inflation systems 310 of this type are well known are therefore not discussed in detail.

In operation, the eclectic current motivates the rotor 236 to rotate relative to the stator 234 and the spindle 226. The rotor 236 transmits the rotational movement to the rotor support 240 and thereby to the sun gear 264 interconnected thereto. The rotor support 240 and the sun gear 264 thereby rotate in unison. The sun gear 264 meshes with the planetary gears 266, imparting the rotational movement to the planetary gears 266. Accordingly, since the planetary gears 266 are mounted to the non-rotating planetary carrier 254, the planetary gears 266 rotate the ring gear 268 about the spindle 226 and the rotational axis R. The inner hub 318 and the outer hub 320, being attached to the ring gear 268, rotate therewith about the rotational axis R to drive the wheel rim 224.

The subject invention therefore provides a compact electric drive wheel assembly 20 by supporting the rotor 36 through the flange 44, which extending upwardly toward the rotor 36 within the predetermined axial distance D of the rotor 36. This allows the braking mechanism 108 to be disposed on one side of the rotor support 40 and the planetary gear system 62 and the wheel drive 52 on the other, both at least partially disposed within the predetermined axial distance D that the rotor 36 extends along the spindle 26.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An electric drive wheel assembly (20) for a vehicle, said assembly (20) comprising;
    a non-rotating spindle (26) having a first end (28) for attachment to the vehicle and a second end (30) spaced from said first end (28) along a rotational axis (R),
    an electric motor (22) concentric with said spindle (26) and including a stator (34) surrounding and secured to said spindle (26) and a rotor (36) concentric with said stator (34) and rotatable about said rotational axis (R) relative to said stator (34),
    said stator (34) and said rotor (36) extending a predetermined axial distance (D) along said rotational axis (R),
    a carrier (54) rotatably connected to said spindle (26) for rotation about said rotational axis (R),
    a wheel drive (52) attached to said carrier (54) for rotation therewith about said rotational axis (R),
    a planetary gear system (62) disposed adjacent said carrier (54) and said wheel drive (52) for transmitting rotational movement of said rotor (36) to said carrier (54),
    a rear cover (90) attached to said carrier (54) and defining a port (98), and
    a flexible member (92) disposed between said rear cover (90) and said carrier (54) in fluid communication with said port for expanding and contracting in response to an internal pressure.

2. An assembly (20) as set forth in claim 1 wherein said flexible member (92) defines an interior chamber (94) and an outer chamber (96) between said carrier (54) and said rear cover (90), and said rear cover (90) includes a with said port (98) in fluid communication with said outer chamber (96) for allowing air to flow into and out of said outer chamber (96) as said flexible member (92) expands and contracts.

3. An assembly (20) as set forth in claim 2 wherein said wheel drive (52), said planetary gear system (62), said carrier (54), said rear cover (90), and said flexible member (92) are interconnected to define a gearbox unit (84) at least partially disposed within said predetermined axial distance (D) and said assembly (20) includes a fastener (86) for removably attaching said gearbox unit (84) to said spindle (26) adjacent said second end (30) of said spindle (26).

4. An assembly (20) as set forth in claim 3 wherein said gearbox unit (84) includes a lubricant for lubricating said planetary gear system (62) and a plurality of seals (100) for sealing said lubricant within said gearbox unit (84).

5. An assembly (20) as set forth in claim 1 wherein said wheel drive (52), said planetary gear system (62), said carrier (54), said rear cover (90), and said flexible member (92) are interconnected to define a gearbox unit (84) at least partially disposed within said predetermined axial distance (D) and said assembly (20) includes a fastener (86) for removably attaching said gearbox unit (84) to said spindle (26) adjacent said second end (30) of said spindle (26).

6. An assembly (20) as set forth in claim 5 wherein said gearbox unit (84) includes a lubricant for lubricating said planetary gear system (62) and a plurality of seals (100) for sealing said lubricant within said gearbox unit (84).

7. An assembly (20) as set forth in claim 1 wherein said rear cover (90) is at least partially disposed between said electric motor (22) and said carrier (54).

8. An assembly (20) as set forth in claim 1 wherein said rear cover (90) is at least partially disposed within said predetermined axial distance (D).

9. An assembly (20) as set forth in claim 1 wherein said flexible member (92) is at least partially disposed within said predetermined axial distance (D).

10. An assembly (20) as set forth in claim 1 wherein said flexible member (92) includes an interior surface facing toward said carrier (54) and an outer surface facing away from said carrier (54) with said surfaces being free from obstruction to permit said expanding and contracting in response to an internal pressure.

* * * * *

UNITED STATES PATENT AND TRADEMARK OFFICE
CERTIFICATE OF CORRECTION

PATENT NO. : 7,622,836 B2 Page 1 of 1
APPLICATION NO. : 12/168298
DATED : November 24, 2009
INVENTOR(S) : Jay DeVeny et al.

It is certified that error appears in the above-identified patent and that said Letters Patent is hereby corrected as shown below:

Column 8, Line 54
    After cover (90), please delete "and said rear cover (90) includes a".

Signed and Sealed this

Second Day of February, 2010

David J. Kappos
*Director of the United States Patent and Trademark Office*